Sept. 17, 1968     J. G. BERKHOUDT ET AL     3,401,920

SPACE HEATING DEVICE

Filed June 27, 1966     3 Sheets-Sheet 1

INVENTORS.
JOHN G. BERKHOUDT
JOHN M. MELISZ

*Beau, Brooke, Buckley & Beau*
ATTORNEYS

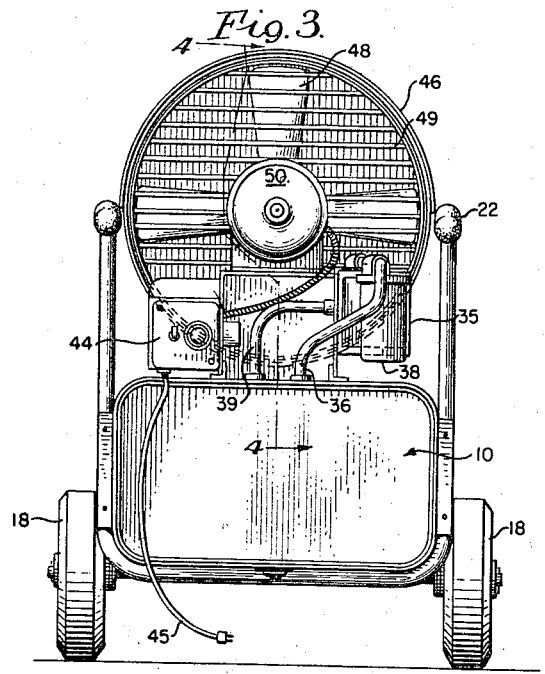
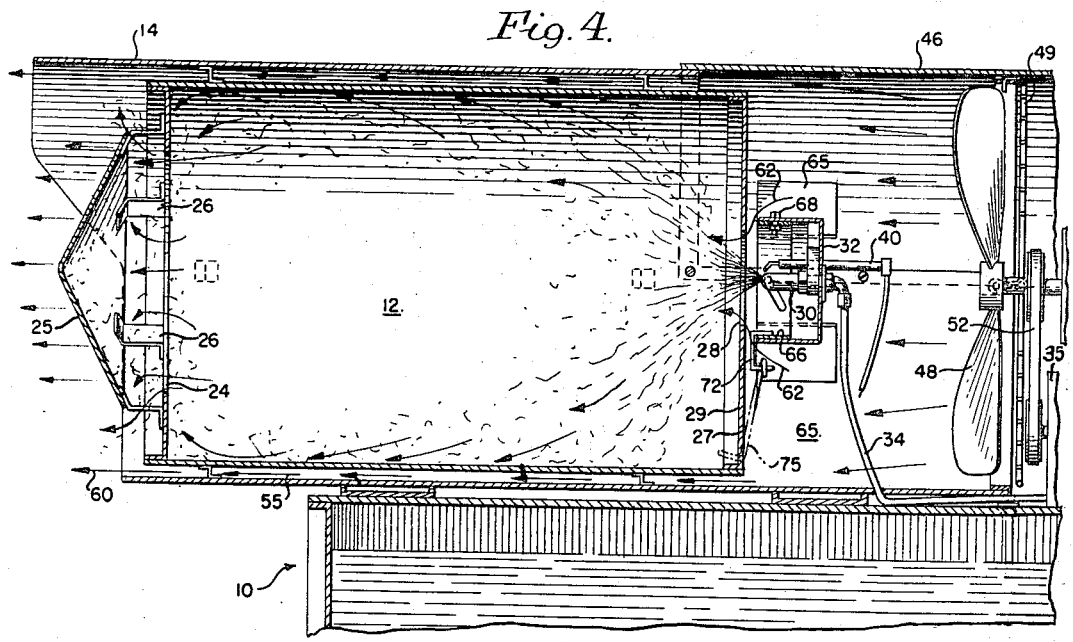

Sept. 17, 1968   J. G. BERKHOUDT ET AL   3,401,920
SPACE HEATING DEVICE

Filed June 27, 1966   3 Sheets-Sheet 3

INVENTORS.
JOHN G. BERKHOUDT
BY   JOHN M. MELISZ

Bean, Brooks, Buckley & Bean
ATTORNEYS

United States Patent Office 3,401,920
Patented Sept. 17, 1968

3,401,920
SPACE HEATING DEVICE
John G. Berkhoudt, Lakeview, and John M. Melisz, Springville, N.Y., assignors to Lisk-Savory Corporation, Buffalo, N.Y.
Filed June 27, 1966, Ser. No. 560,526
4 Claims. (Cl. 263—19)

ABSTRACT OF THE DISCLOSURE

The burner unit of a space heating device is held in place by air flow control vanes which position the burner unit in spaced relationship to the combustion chamber inlet opening and an adjustable collar is telescopically received in the burner unit housing selectively to control the effective area of the air inlet.

---

This invention relates to "space" heaters, such as are used to provide temporary heat, as on building construction jobs; for preheating cold engines; for thawing or drying purposes; for warehouse heating; warming workman or work or play areas; and like purposes.

A primary object of the present invention is to provide an improved machine as aforesaid which may be readily adjusted to maintain an optimum combustion balance (air per pound-to-fuel per pound ratio) under typically variable atospheric and/or fuel characteristic conditions.

Another object is to provide an improved machine as aforesaid which embodies improved means for controlling flameout tendencies.

More specifically, it is an object to provide a machine as aforesaid with improved facilities for adjusting the volume of air-to-fuel intake ratio in order to compensate for variations in the ambient atmosphere temperature, pressure, and/or humidity conditions, whereby to maintain the ideal combustion balance condition.

Another object is to provide in a machine as aforesaid improved means for adjusting the air intake control to adapt the equipment to operate at high efficiency on fuel oils of different types or grades and incorporating different additives and/or contaminants, and/or when operating upon the same fuel under different temperature and/or specific gravity conditions.

Other objects and advantages of the invention will appear from the specification hereinafter and the accompanying drawing wherein:

FIG. 3 is a rear end elevational view thereof;

FIG. 4 is a fragmentary, enlarged scale, sectional view taken as suggested by line 4—4 of FIG. 3;

As shown by way of example herein, the present invention is incorporated in a space heater comprising generally a combination base and fuel tank component indicated generally at 10; a combustion chamber indicated generally at 12 and having an air conducting shroud 14 therearound; the combustion chamber and shroud unit being mounted on the tank-base 10 as by means of brackets 16. To facilitate portability of the machine from place to place it may be provided as shown with paired wheels 18—18, and a combination vertical stand and handlebar unit 20. A supplemental handlebar unit may also be provided to extend from the frame at the other end of the machine for the convenience of the movers.

Figure 1:
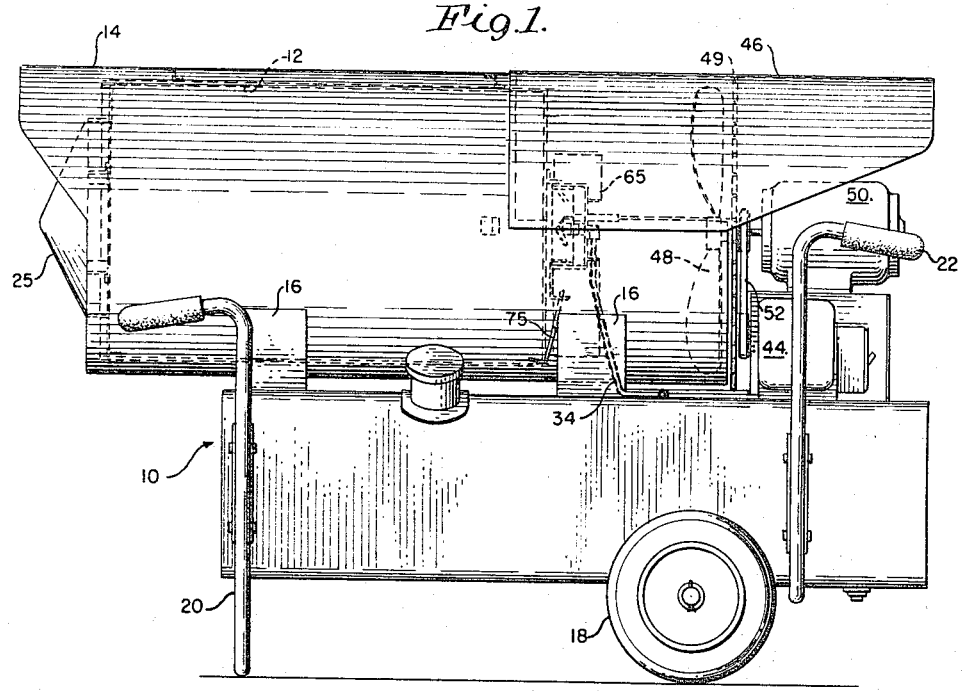
FIG. 1 is a side elevational view of a portable type space heater embodying the present invention.
Figure 2:
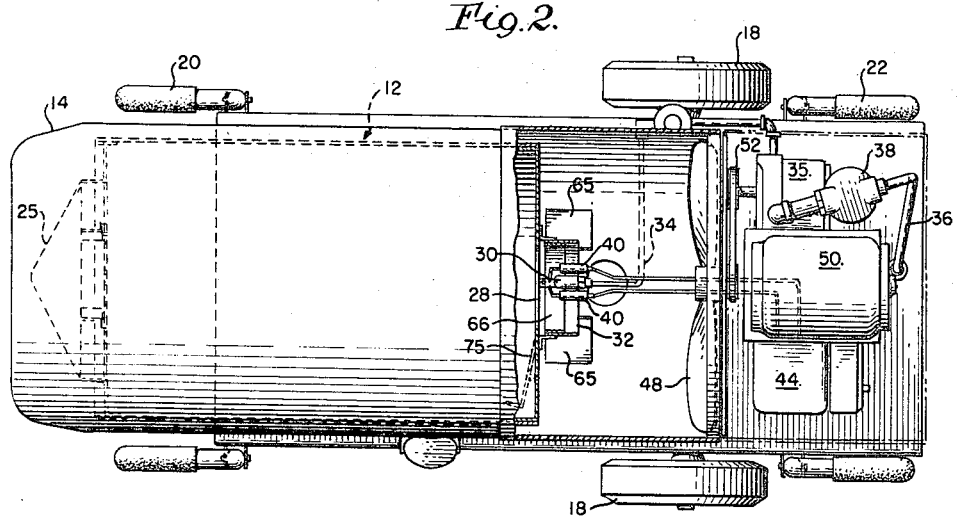
FIG. 2 is a top plan view thereof with a portion of the upper cover structure cut-away and parts shown in section to reveal the interior mechanism.
Figure 5:
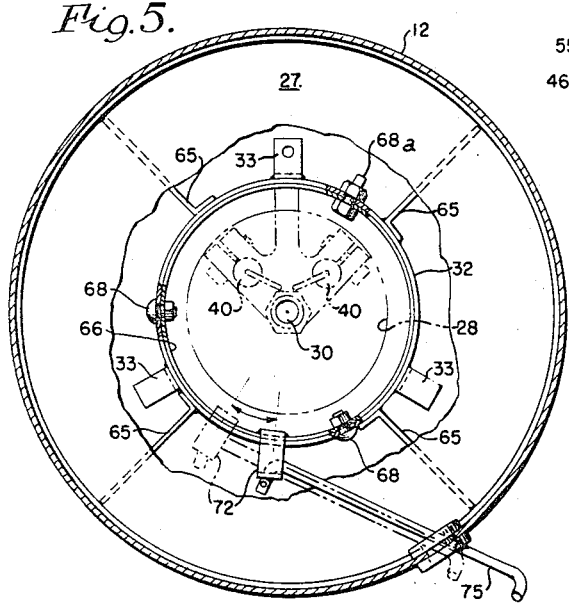
FIG. 5 is a sectional view taken as indicated at 5—5 on FIG. 6.
Figure 6:
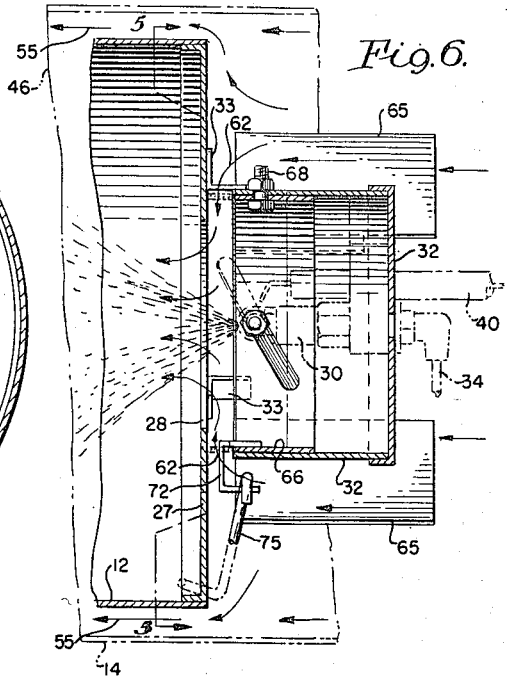
FIG. 6 is an enlarged scale view of a detail of FIG. 4.

The combustion chamber 12 comprises a cylindrically shaped drum having at its outlet end a burnt-gas escape opening as indicated at 24 (FIG. 4) covered by a cone-shaped baffle 25 held in spaced relation therefrom by brackets 26. At its inlet end the rear end wall 27 of the combustion chamber is provided with a circular aperture 28 and a liquid fuel spray nozzle as indicated at 30 is mounted on a housing 32 by means of "spider" brackets 33 (FIGS. 5, 6) to project atomized fuel through the opening 28. The nozzle 30 is supplied from the tank 10 as through a conduit 34 under pressure supplied by a pump 35. Preferably the line from the tank to the pump includes a filter 38 and a bypass line 39 runs from the pump to the tank to permit the oil to circuate when the valve controlling the burner is "off". The burner igniters are illustrated at 40—40 and may be of any preferred type controlled by an electrical system terminating in a machine control panel 44 arranged for connection to any house current supply, as by means of an extension cord illustrated at 45.

The air supply system for the machine includes the rearwardly extending end portion of the shroud 14 (in cooperation with a removable top cover plate 46 which is readily demountable to provide access to the interior mechanism). While the machine is in operation the cover plate 46 completes a cylindrical tunnel through which air is forced by a fan 48 driven by a motor 50; the motor drive shaft being conveniently coupled by means of a belt-pulley system 52 to the pump 35. The fan 48 is preferably protected against interference with foreign objects by means of a screen 49.

Thus operation of the motor 50 will simultaneously drive the pump 35 and the fan 48. The fan projects a blast of air forwardly against the rear end of the combustion chamber and through the air heating space as indicated at 55 (FIGS. 4, 6 and 8) around the combustion chamber wall inside of the shroud 14, whereby it discharges from the machine as indicated at 60 (FIGS. 4, 8) in heated form. To supply air for the fuel combustion operation the drum shaped housing 32 as mounted in spaced relation from the rear plate 27 of the combustion chamber so as to provide an annular air gap therebetween for inlet of air as indicated at 62 (FIG. 4, 6) peripherally of the oil spray from the nozzle 30, thereby intimately admixing therewith as it enters the combustion zone.

Figure 7:
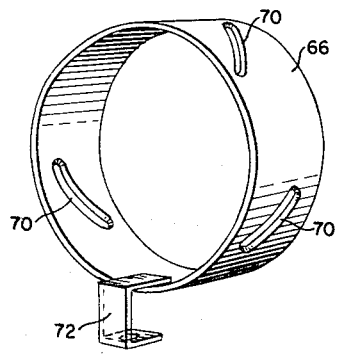
FIG. 7 is a disassembled perspective view of a control element of the mechanism of FIGS. 5, 6.

To facilitate proper directional flow of the combustion air into the aperture 28 a series of radially extending guide vanes 65 are provided, and an air gap size regulator is provided in the form of a collar 66 which slide-fits inside the cylindrical wall of the housing 32. The collar 66 is mounted therein by means of guide screws 68 carried by the housing 32 and extending through diagonally slotted openings 70 formed in the collar (FIG. 7). A control arm 72 is welded to the collar (FIGS. 4–7) for engagement by a control rod 75 extending to a position externally of the machine. As indicated at 68a (FIG. 5), one of the collar guide screws may be of the lock screw type for locking the collar in any desired position of adjustment.

Therefore, it will be apparent that from externally of the machine an attendant may with ease and facility manually adjust the push-pull control rod 75 so as to shift the collar 66 rotationally. The width of the annular air inlet gap controlling the flow of air through the combustion chamber inlet opening 28 may thereby be adjusted in accordance with fuel supply variables, in order to maintain optimum combustion efficiency conditions as evidenced by the color of the combustion flame, smoke production, and the like.

Figure 8:
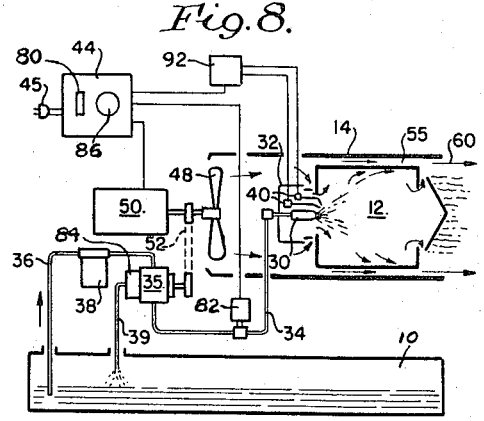
FIG. 8 is a schematic of the operational control and control adjustment system of the machine.

As illustrated at FIG. 8, the machine control panel 44 includes a main "on-off" switch 80 which is manually operable to control the motor 50 and thereby indirectly the fuel pump 35 and the fan 48. Flow of oil to the nozzle 30 is controlled by a solenoid valve 82; the excess oil pump pressure being relieved back to the tank 10 by operation of a regulator valve 84 in connection with the pump 35. Thus oil in the line to the solenoid valve 82 is held at a predetermined "regulated" pressure. The valve 82 is arranged to be controlled by a thermostat 86 which is manually adjustable to operate automatically at any desired room temperature, to open the valve 82 and permit oil to flow to the nozzle 30. Such operation of the thermostat 86 also actuates an electric transformer as indicated at 92 which thereupon energizes the igniters 40, thereby initiating the combustion cycle.

It will of course be appreciated that whereas only one specific embodiment of the invention has been illustrated and described by way of example herein, various changes may be made therein without departing from the spirit of the invention and/or the scope of the following claims.

We claim:

1. A space heating machine comprising in combination a cowling defining an air passageway open at opposite ends, a combustion chamber positioned within said cowling and spaced therefrom to provide an air passage between said chamber and said cowling, said chamber having a combustion air inlet opening and a combustion gas discharge opening at its opposite ends, a burner unit, said burner unit including a housing having an open side, a plurality of guide vanes to axially guide air passing through the cowling extending from said housing to said cowling and positioning said open side of the housing in spaced registry with said cobustion air inlet opening of the combustion chamber and thereby defining therebetween an annular air control inlet opening in communication with said chamber, an air inlet control collar telescopically and rotationally slidable in said housing and being axially shiftable toward and away from said combustion chamber for regulating the effective size of said air control inlet opening, igniter means adjacent said combustion air inlet opening, a fuel delivery line terminating in nozzle means operable to deliver atomized fuel through said combustion air inlet opening into said chamber and past said igniter means, air displacement means operable to drive air to flow into said cowling at the air inlet end thereof and through the machine and out at the other end of said cowling.

2. A space heater as set forth in claim 1 wherein said air inlet control collar is helically slotted and engaged thereat by guide pins extending from said housing, whereby rotation of said collar on said housing causes it to shift axially thereon for regulating the air inlet opening.

3. A space heater as set forth in claim 2 wherein a push-pull strut device extends from externally of the machine into connection with said collar, whereby the latter may be rotated for air inlet opening size regulation by manual operation of said strut device.

4. A space heater as set forth in claim 3 wherein one of said collar engaging pins is of the lock pin type, thereby adapted to lock said collar in any desired position of adjustment.

References Cited

UNITED STATES PATENTS

| | | | |
|---|---|---|---|
| 1,042,600 | 10/1912 | Randall | 126—293 |
| 2,757,721 | 8/1956 | Reed et al. | 158—1.5 |
| 3,211,439 | 10/1965 | Fahlberg | 263—19 |
| 3,240,478 | 3/1966 | Marks | 263—19 |
| 3,263,978 | 8/1966 | Safford | 263—19 |

FREDERICK L. MATTESON, JR., *Primary Examiner.*

E. G. FAVORS, *Assistant Examiner.*